(12) United States Patent
Strabala

(10) Patent No.: US 6,200,379 B1
(45) Date of Patent: Mar. 13, 2001

(54) FLY ASH COMPOSITES AND METHODS FOR MAKING SAME

(75) Inventor: William M. Strabala, Arvada, CO (US)

(73) Assignee: Midway Environmental Associates, Inc., Arvada, CO (US)

( * ) Notice: Subject to any disclaimer, the term of this patent is extended or adjusted under 35 U.S.C. 154(b) by 0 days.

(21) Appl. No.: 09/029,554

(22) PCT Filed: Sep. 6, 1996

(86) PCT No.: PCT/US96/14332

§ 371 Date: May 6, 1998

§ 102(e) Date: May 6, 1998

(87) PCT Pub. No.: WO97/09283

PCT Pub. Date: Mar. 13, 1997

Related U.S. Application Data (60) Provisional application No. 60/003,456, filed on Sep. 8, 1995, provisional application No. 60/003,676, filed on Sep. 15, 1995, provisional application No. 60/011,144, filed on Jan. 31, 1996, provisional application No. 60/012,570, filed on Feb. 29, 1996, and provisional application No. 60/015,452, filed on Jun. 16, 1996.

(51) Int. Cl.$^7$ .................................................. C04B 18/06
(52) U.S. Cl. .................. 106/705; 106/707; 106/792; 106/DIG. 1
(58) Field of Search ............................ 106/DIG. 1, 705, 106/707, 792

(56) References Cited

U.S. PATENT DOCUMENTS

| | | | |
|---|---|---|---|
| Re. 30,943 | 5/1982 | Nicholson | 106/85 |
| 1,608,562 | 11/1926 | Melandri . | |
| 1,944,007 | 1/1934 | Hobart | 25/156 |
| 2,250,107 | 7/1941 | Nelles | 106/97 |
| 2,382,154 | 8/1945 | Jones et al. | 106/118 |
| 2,564,690 * | 8/1951 | Havelin et al. . | |
| 2,606,126 | 8/1952 | Weber | 106/87 |
| 2,948,948 | 8/1960 | Duplin, Jr. et al. | 25/156 |
| 3,625,723 | 12/1971 | Sicka | 106/86 |
| 3,679,411 | 7/1972 | Harvey | 106/41 |
| 3,700,470 | 10/1972 | Barton | 106/75 |
| 3,753,749 | 8/1973 | Nutt | 106/93 |
| 3,852,084 | 12/1974 | Webster et al. | 106/118 |
| 3,901,991 | 8/1975 | Ueda et al. | 428/446 |
| 3,944,425 | 3/1976 | Magder | 106/40 |
| 3,991,005 | 11/1976 | Wallace | 260/38 |
| 4,084,381 | 4/1978 | Cain et al. | 61/36 |
| 4,132,555 | 1/1979 | Barrable | 106/90 |
| 4,318,996 | 3/1982 | Magder | 501/84 |
| 4,406,703 | 9/1983 | Guthrie et al. | 106/93 |
| 4,448,914 | 5/1984 | Drinkuth et al. | 524/32 |
| 4,514,307 | 4/1985 | Chestnut | 210/751 |
| 4,659,385 | 4/1987 | Costopoulos et al. | 106/87 |
| 4,780,114 | 10/1988 | Loggers | 106/118 |

(List continued on next page.)

OTHER PUBLICATIONS

Kosmatka et al. Design and Control of Concrete Mixtures, Engineering Bulletin, Thirteenth Edition, 1988 Utilization of Coal Combustion By–Products for Masonry Construction, Electric Power Research Institute.

*Primary Examiner*—Paul Marcantoni
(74) *Attorney, Agent, or Firm*—Sheridan Ross P.C.

(57) ABSTRACT

Composite materials having fly ash as a constituent is manufactured into a sulfur-less gypsum-like material, a portland cement-like material and a lightweight aggregate. Methods for making such composite materials include combining precipitated calcium carbonate and either Class C-fly ash, Class F-fly ash and/or bottom ash in particular ratios by adding water to dry material and subsequently allowing the material to dry to create the above-described products. Methods for forming and using such composites include the use of a single piece gatefold form for casting manifold surfaces, a panel system for forming concrete walls and a system for creating retaining walls.

12 Claims, 11 Drawing Sheets

U.S. PATENT DOCUMENTS

| | | | |
|---|---|---|---|
| 4,840,672 | 6/1989 | Baes | 106/86 |
| 4,877,453 | 10/1989 | Loggers | 106/118 |
| 4,985,119 | 1/1991 | Vinson et al. | 162/149 |
| 5,048,250 | 9/1991 | Elias | 52/437 |
| 5,100,473 | 3/1992 | Mitsuda et al. | 106/705 |
| 5,102,596 | 4/1992 | Lempfer et al. | 264/115 |
| 5,154,771 | 10/1992 | Wada et al. | 106/730 |
| 5,350,451 | 9/1994 | Patterson | 106/805 |
| 5,366,548 | 11/1994 | Riddle | 106/705 |
| 5,405,211 | 4/1995 | Halwani | 404/46 |
| 5,622,556 * | 4/1997 | Shulman | 106/677 |
| 5,704,972 * | 1/1998 | Ivkovich | 106/710 |
| 5,725,652 * | 3/1998 | Shulman | 106/677 |

* cited by examiner

Fig. 1

Calcined Mixture Composition
Weight % Precipitated CaCO3 (Raw Dry Basis) vs. Oxide Content

FLY ASH COMPOSITES AND METHODS FOR MAKING SAME

This application is a 371 of PCT/US96/14332, filed Sep. 6, 1996 and claims benefit of Provisional Ser. Nos. 60/003,456 filed Sep. 8, 1995 and claims benefit of Ser. No. 60/003,676 filed Sep. 15, 1995 and claims benefit of Ser. No. 60/011,144 filed Jan. 31, 1996 and claims benefit of Ser. No. 60/012,570 filed Feb. 29, 1996 and claims benefit of Ser. No. 60/015,452 filed Jun. 16, 1996.

FIELD OF THE INVENTION

The present invention is directed to the use of fly ash as a constituent for making various composite materials. More particularly, the present invention is directed to products, and methods of making such products, directed to a sulfurless gypsum-like product, cementitious building material, panel systems for forming concrete walls, retaining walls, light weight aggregate and a single piece gatefold form for casting manifold surfaces.

BACKGROUND OF THE INVENTION

Environmental and economic pressures on the disposal of waste streams from two separate industries has led to the need to do more with these wastes than to bury them. The wastes are ash from coal-burning power plants, and spent lime (Precipitated Calcium Carbonate, or PCC) from sugar beet processing mills. The inventor has discovered that these disparate waste streams can be compatibly processed to create certain commercial products. Proper understanding of the invention for going beyond burial of these wastes requires certain distinctions, by type, among coal ashes:

1. "C" class fly ash is a fine powder residue from burnt coal that is captured by filtration from power plant flue gas. When mixed with water, it hardens like cement due to its pozzolanic mineralogy. Such mineralogy comes from the nature of certain sub-bituminous or lignite-type coals. The present use for C-class fly ash is limited mostly to that of an additive to portland cement and concrete, but much of the ash is buried in the ground.
2. "F" class fly is a fine powder residue from burnt coal that is captured by filtration from power plant flue gas. When mixed with water it will not harden like cement because it contains unburned carbon and has a non-pozzolanic mineralogy. Most "F" class fly ash contains a significant amount of unburned carbon (which give sit a gray or black hue) and it is deficient in calcium oxide. Usually, it is the anthracite or bituminous coal which produces this type of ash. Most of this ash is buried in the ground. "F" class fly ash can be mixed with C-class fly ash to form a semi-hardened "flashfill" for trenches. It should also be noted that some F-class fly ash contains little or no unburned carbon, and can be used as an additive for portland cement. This kind of F-class ash will harden with water, but more slowly than C-class fly ash.
3. Bottom ash is a granular or clinkery residue consisting of mostly silicon dioxide and aluminum oxide. Bottom ash collects in the bottoms of furnaces and boilers where the coal is burned and quenched with water before removal. Except for limited roadway uses, most of this ash is buried in the ground.
4. In the beet sugar industry, hydrated lime is used to remove impurities from sugar made from beets. The precipitated lime (PCC) is placed in vast settling ponds and scooped into piles as it dries. This spent lime can be recalcined to calcium oxide (quicklime) by heating it to about 800–900° C. for periods of about 10 to about 30 minutes, but generally this process is more expensive than the purchase of fresh hydrated lime, and so PCC is considered as a waste. Most often, huge piles of PCC are simply left in heaps on the ground. As processing continues, these waste piles continue to grow.
5. To appreciate the present invention, it is also helpful to understand the process-origins of certain compounds in portland cement which give it its strength.

Pulverized limestone is the main constituent in portland cement. To the extent that the limestone lacks oxides of aluminum, silicon and iron, these minerals are added in the desired proportions at the time the calcination proceeds in cement processing. Calcination, or heating of the limestone, changes it chemically from $CaCO_3$ to $CaO$. However, to obtain compounds such as dicalcium silicate and tricalcium silicate, which contribute to the strength of portland cement, the calcined mixture must be taken to the liquid, or melting phase. Generally, this will be in the range about 1,000° C. When cooled, clinkers are formed that contain dicalcium silicate and tricalcium silicate. The clinkers are then crushed and milled into portland cement.

In the course of operation, it is common for paper mills to accumulate vast quantities of fibrous cellulose material in the settling ponds of their process water. Recent practice has been to skim and strain the fibrous matter from the pond water or to let the fibrous matter separate by evaporation. As a result of these processes, the cellulose fibers stick together in small clumps, forming paper wads or "pebbles", which can range in size from about 1/16 inch to about 1½ inch. It has been the practice of the paper industry to windrow these "pebbles" for drying before plowing them into agricultural soils to help loosen the soil. However, this practice has had some negative cumulative effects on the environment because the paper material has trace amounts of environmentally offensive chemicals. Mills are now required to dispose of this material in a manner more friendly to the environment.

In the utility industry, there is a grade of coal ash known as "C" fly ash which is pozzolanic in its mineralogy. That is, "C" fly ash will harden like cement when water is added. Unlike cement, this hardening typically occurs within the space of a few minutes. The main use for this fly ash is as an additive to cement, but large amounts of the fly ash are still buried in the ground.

It would be advantageous to provide a means for producing a useful product utilizing predominately waste materials. It would particularly be advantageous to utilize waste cellulose fibers, such as from paper mill waste, and the waste fly ash from coal burning processes, to produce a commercially useful structural material.

It is becoming common practice in the construction of foundation walls to use interlocking lightweight polystyrene panels, supported by internal plastic brackets and external temporary bracing, as forms to receive concrete. The main advantage, from a building cost standpoint, is the reduction of labor costs associated with erecting the form and removing the form, as is the case with plywood panels. Polystyrene, which is kept in place after the concrete is poured, is insulative and water repellent. However, it offers some toxic smoke hazards on inside walls when subjected to fire. Moreover, the polystyrene is so lightweight that it offers no chance of mechanical attachment as with nails or screws, and it tends to bow or flex under pressure from the liquid concrete. To counteract this pressure, plastic retainers are fixed to pre-formed slots on the inside of the polystyrene panels to hold the wall forms to a consistent width against the outward pressure of the concrete. These plastic retainers form an interior lattice which also supports bars of reinforcing steel. When the concrete sets, the plastic and steel become integral with the concrete, continuing to hold the polystyrene to the wall surfaces.

The casting of concrete or other cementitious blocks or bricks which have multi-axial shaping or texturing on four or more sides by means of a single casting process usually requires multi-piece forms. Much of the casting difficulty lies in what is known as "release," that is, separating the form from the molded product quickly for the sake of mass production. This difficulty is compounded when casting an item which is "pierced," i.e., has one or more internal holes or cavities extending from one side to another. Quite often, very expensive equipment and multiple dies are required to achieve the desired effect, or milling may be necessary after casting.

It would be desirable to have methods for producing useful products which incorporate conventional waste materials derived from coal burning and/or sugar refining. The present invention in its various aspects, relates to processes and products that involve the use of such material.

SUMMARY OF THE INVENTION

According to one aspect of the present invention, heat within a rotating kiln is advantageously used as a means of chemically changing the PCC and the F-class fly ash when the two are mixed together. The chemical synergism is this: Ash that previously was not pozzolanic becomes pozzolanic and becomes hardened within a matrix of metal hydroxides. Calcium carbonate that previously had no ability to harden is converted to calcium oxide and helps harden the cementitious mixture when water is added. As a result, spent lime does not need to be discarded as a waste. The two wastes work together chemically, when treated as described below, to make viable commercial products such as a sulfur-less substitute for gypsum used in wallboards, and a substitute for portland cement, particularly useful in low-strength, lower cost applications. The significant difference in such hydraulic powders, as distinguished from portland cement or gypsum, is that a sizeable portion of the later products' mineralogy is derived from coal byproduct. In the case of the gypsum substitute, the raw material is not mined, it is fabricated from waste and does not contain any sulfur.

According to another aspect of the present invention, moist paper pebbles, preferably acquired from a paper-mill operation, can be advantageously coated with substantially pozzolanic fly ash and, preferably, a binder such as polyvinyl acetate. The resulting product is a manufactured aggregate that is relatively lightweight and which can replace sand and gravel in certain concrete applications, including manufactured decorative stones for walls. In effect, a new raw material is created for the building materials industry.

The preferred materials according to another aspect of the present invention include: precipitated calcium carbonate (PCC), an industrially common waste lime that is typically produced as a sugar refining by-product; class C fly ash, a pozzolanic powder resulting from the combustion of pulverized coal in boilers and furnaces of various industries, particularly electric utilities; and bottom ash, an ash resulting from the combustion of coal in boilers and furnaces of various industries. The bottom ash may be optionally included in the composition of the present invention as an aggregate filler.

The present invention is useful for the prevention of mudslides and rockslides in hilly terrain and for the rapid and relatively inexpensive response to the continuing threat thereof. It is also useful for the quick backfilling of pipeline and other trenches because of its quick-hardening yet removable characteristics, for example if trench re-entry is required.

To understand the invention, it is important to note the distinctions among coal ashes and the characteristics of waste lime.

Class C fly ash is fly ash which is usually produced from lignite or sub-bituminous classes of coal. It is the finely divided residue resulting from the burning of pulverized coal, and will harden quickly after contact with water. It is pozzolanic primarily because it contains calcium oxide ("free lime").

Class F fly ash, which is not preferred for use according to this particular aspect of the present invention, is fly ash which is usually produced by burning anthracite or bituminous coal. Because it retains some carbon and lacks substantial amounts of calcium oxide, it generally will not harden by itself on contact with water. However, in a mixture with class C fly ash it will form chemical bonds and quickly unite in a hardened mixture. Its primary chemical constituents are silicon dioxide and aluminum oxide.

Bottom ash is that which results from the combustion of any type of coal. It agglomerates into sandy or clinkery form in the bottom of furnaces and boilers. It can be somewhat pozzolanic but generally will not harden by itself on contact with water. However, in a mixture with class C fly ash it will form chemical bonds and quickly unite in a hardened mixture. It is also high in compounds of silicon and aluminum.

Waste lime typically forms from either free lime or hydrated lime that has reacted to become calcium carbonate. As such, it is chemically inert when mixed with water. However, because of its calcium content, it will form chemical bonds when mixed with class C fly ash and quickly become part of a hardened material.

PCC is a waste that presents both economic and environmental disposal problems, as does the disposal of class C fly ash, given its high volume in relation to its use. The present invention combining the two materials, provides a solution to these disposal problems by creating a commercial product applicable to the engineering need.; of certain projects, as noted above. Because the two primary materials are wastes, they are low in cost compared to materials such as Portland cement.

The present invention also provides a stackable, single-piece block as a component for a retaining wall, incorporating as part of its structure a tie-back or "deadman" feature which uses the weight of the backfill to vertically stabilize the wall and the retained embankment. The block is preferably made from cementitious waste materials discussed hereinabove. The wall system is preferably designed in such a way as to baffle highway sounds. It typically has been the practice to suppress roadway noise by erecting wooden fences at the edges of the right of way. However, wood is expensive and such uses create a burden on environmental resources. Cast concrete retaining walls that are expensive and have little or no aesthetic value are often used on steep embankments, such as walls that are adjacent to highway overpasses.

According to a further aspect of the present invention, recycled waste material that is lower in cost and stronger than polystyrene is used to fabricate interlocking permanent panels for forming concrete walls. The panels are less complex in configuration and can be sawed and nailed to fit on site. The material also affords a certain amount of insulation and is fire resistant. A simple retainer or lattice system, preferably made from recycled plastic, is preferred and is designed for use with temporary external braces and tie-wire prior to the pouring of concrete.

According to an additional aspect of the present invention, cast bricks and blocks which require complex shapes for interlocking or texturing features can be cast with a side down on an independent surface which is either featureless or textured, in a form that has all of its shaped sides hinged together in a gatefold arrangement. To provide for piercing, it is advantageous to provide button-like protrusions on the surface of opposing sides, onto which plastic or paper tubes may be affixed before closing the form to its design shape. When the cast material has hardened, the entire form can be opened as a single piece, with the piercing tubes remaining in place inside the block. The button-like protrusions, because they are minimal in depth, easily pull free from the rim of the tubes.

The holes thus rendered inside the block may be of any dimension or shape, and they are advantageously formed at the same time that complex contours are provided on the several sides or surfaces. However, the ability to provide this piercing and internal shaping in this manner remains optional. The form, even with its permanent button-like fixtures, can be used to cast blocks with just surface features simply by not inserting the plastic or paper tubes. The impression left on blocks by the button fixtures without tubes is negligible. This invention is most useful in that it provides features within a cementitious or semi-cementitious casting on six surfaces and two or more axes in one process by means of a single external mold or form.

DETAILED DESCRIPTION OF THE INVENTION

One aspect of the present invention relates to the production of a cementitious building material using recycled waste materials. The results are inexpensive, fast-setting hydraulic powders which bestow commerciality on both coal ash waste from electric power plants and spent lime waste (PCC) from, for example, beet sugar mills. These hydraulic powders may serve as substitutes for gypsum in wallboard, or portland cement in low-load uses.

Coal ash, including F-class fly ash as well as bottom ash in the presence of heat is mixed with waste calcium carbonate (PCC) to synergistically react and form a useful cementitious material.

According to the present invention, it is preferable to use C-class fly ash. C-class fly ash is a lower-carbon form of fly ash and is a byproduct of the combustion of lignite type coal. C-class fly ash can be distinguished F-class fly ash, which is a byproduct of burning coal having a higher carbon content and therefore F-class fly ash has higher carbon content. Preferably, fly ash used in the present invention is predominantly F-class fly ash.

Figure 1:
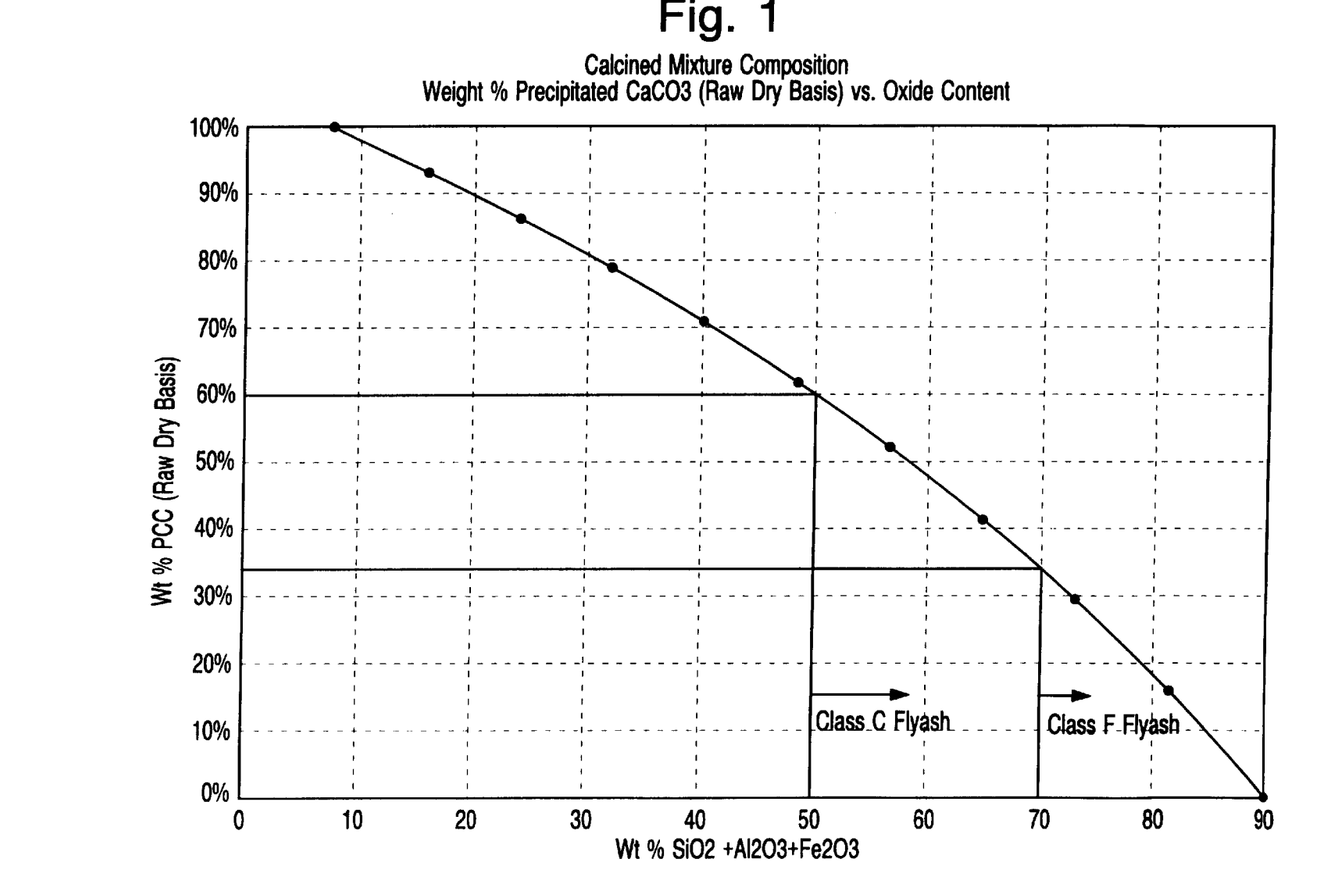
FIG. 1 is a graph showing the weight percent of fly ash on the X-axis as compared to the weight percent of PCC on the X-axis versus the weight percent of SI02 plus AL203 plus FE203 on the Y-axis, such graph showing the calcined mixture composition of precipitated $CaCO_3$ in relation to oxide content.

Depending upon the metal oxide content analysis of the fly ash and bottom ash, the wastes are combined in ratios that will approximate the metal oxide content of portland cement. For example, the fly ash from Cherokee electric generating unit of Public Service Company of Colorado contains oxides of silicon, aluminum and iron that are analogous to a ratios in portland cement. But the ash lacks calcium, which is provided to the mixture by the PCC. Tests have shown that a mixture ranging between 33 and 60 weight percent PCC with Cherokee fly ash will produce a pozzolan. (See FIG. 1). Process requirements include calcining the mixture at about 800–900° C. for about 10 to about 60 minutes.

The resulting pozzolan, without the addition of bottom ash, is generally gypsum-like in color, density and strength after hydration and curing. It is white, has specific gravity of 2.0 and compressive load strength of about 200 psi after 10 days of curing. This compares to a specific gravity of 2.4 for gypsum and compressive load strength of about 200–500 psi for natural gypsum (which has not been treated for air entrainment in wallboard).

A significant difference is noted between the present invention and gypsum when soaked in water. Wallboard gypsum softens and crumbles when wetted, while the fly ash pozzolan, which has been given the name Cal-Ashcrete™, does not soften or crumble. Thus, an advantage of its use in wallboard where accidental exposure to water ingress is a consideration.

Another significant advantage of Calc-Ashcrete is its fire resistant properties. Calc-Ashcrete is processed at about 900° C., such temperature being higher than the fire-testing limit for gypsum wallboard.

When the object is to create a hydraulic cement from the Calc-Ashcrete of strength greater than 200 psi, two different approaches can be taken: The Calc-Ashcrete mixture can be taken to the liquid phase by heating to over about 1000° C. during the calcining step. Alternatively, especially if the fly ash contains; insufficient levels of silica, is to add pulverized bottom ash containing silica.

The bottom ash is coal ash which has been taken through the liquid or melting phase. Like portland cement, it contains dicalcium and tricalcium silicate, with much of the silica portion coming, in this case, from the coal ash mineralogy. When such bottom ash is crushed and then added to the fly ash-PCC mixture and co-calcined, the strength of the silicates comes into play when the resulting powder is hydrated.

Although the weight percent ratios of the mixture to be calcined will vary depending upon the mineralogy of the coal involved, in the case of the Cherokee fly ash-bottom ash, the weight percentages of the mixtures to be co-calcined are approximately 33 weight percent—60 weight percent. 20 weight percent—34 weight percent fly ash and 20 weight percent—33 weight percent for bottom ash. These ranges are preferable and can vary with respect to the amount of fly ash and bottom ash. The resulting hydraulic powder, after hydration and curing for 28 days, has a specific gravity of about 2.0 and a compression load strength of about 1,000 to about 2,000 psi. Similar density and strength readings result from the Calc-Ashcrete mixture taken directly to liquid phases. By way of comparison, the specific gravity of portland cement is 2.7–3.0 with a compression load strength of more than 3,000 psi.

The composition of the present invention can be used to make various articles having distinct uses. For example, in accordance with the present invention, large articles typically made from cement can be produced having characteristics similar to portland cement. Alternatively, the present invention can be used to create wallboard that has similar strength and density characteristics as conventional gypsum wallboard.

Another aspect of the present invention relates to the method for making articles from the composition of the present invention. Such method involves the following steps: providing sufficient amount of fly ash (either C-class fly ash or F-class fly ash or bottom ash); providing precipitated lime (PCC), mixing the PCC and fly ash together in the presence of water. Chemical reaction proceeds between various components changing the non-pozzolanic material to pozzolanic material such that the material becomes hardened within a matrix of metal hydroxides. Importantly, the compositions used in the present invention lack significant amounts of sulfur, in contrast to gypsum which contains significant amounts of sulfur.

A separate aspect of the present invention relates to the production of a light weight aggregate by using pozzolanic grade coal fly ash with pebblized crumbs of fibrous paper waste, preferably from mill flotation ponds. The pozzolanic coating, preferably reinforced with a binder, provides a crush-resistant shell and makes the paper pebbles' surface highly bondable within cementitious mixtures, resulting in a lighter weight concrete or manufactured stone product.

According to an embodiment of the present invention, waste paper material, for example cellulosic fiber, in the form of pebbles is advantageously converted into a useful aggregate by moistening the paper pebbles with water, preferably with a water-diluted mixture of polyvinyl acetate or similar binder. The polyvinyl acetate or an equivalent binder can be diluted in virtually any proportion desired, but preferably the mixture is in the range of 7 to 15 parts of water to 1 part binder. The waste paper material is preferably obtained from the waste effluent of a paper mill. However, other sources of cellulosic fiber can be used, such as coarse sawdust or ground-up reclaimed lumber. After immersion in the water/binder mixture, the paper pebbles are drained by gravity or centrifuge before introduction to the fly ash, but still have a moist coating of water or water/binder on the surface of the pebble.

These moistened pebbles are then coated with predominately "C" fly ash. For example, the moistened pebbles can be tumbled in a mixer filled with "C" fly ash for about 1 to 2 minutes to thoroughly coat the surface thereof. Other methods for creating this chemical reaction between the cellulose and ash, besides mixing and tumbling the two materials, can be achieved, such as by dropping the moist pebbles through a vertical chamber into which a constant cloud of fly ash is injected and agitated, or by using forced air streams to keep the moist pebbles floating and percolating through a closed atmosphere of fly ash. Each pebble continues to accumulate fly ash coating until the moisture available for hydration is absorbed by the fly ash. Drying requirements are thereby minimal.

Movement of the paper pebbles into and after the treatment process can be by, for example, a pneumatic pipe system. For the final stages of drying, the aggregate is preferably allowed to cascade loosely through a tall vertical shaft of upwardly-forced warm air (preferably about 120° F.) as it goes into storage. This flow of air would preferably be in a closed loop for dust and moisture removal. Screening for size could occur preferably during final drying enroute to storage. A sacking plant is desirable and would preferably be managed just prior to storage.

As a result of the foregoing, the moist paper material reacts at room temperature with the ash, thereby forming a cement-like coating on the paper surface which begins to harden within seconds. After taking steps to dry these pozzolanic pebbles, for example by exposure to ambient or mildly heated air, a hardened composite aggregate is formed that comprises a cellulosic core with a cementitious layer substantially covering the core. The composite aggregates can be assimilated much like limestone gravel when mixed with cement or fly ash slurry. The two waste materials are thereby utilized advantageously to produce a chemical synergism that neither of them has separately.

The treatment described hereinabove essentially calcinates the cellulose without adding heat as a catalyst, helping it achieve a strong bond within the concrete which the cellulose alone would not do. The binder advantageously increases the structural strength of the composite aggregate and gives it some resistance to water once dried. Because the composite aggregate is much less dense than mined aggregates, it is instrumental in creating a lightweight concrete in applications and products where that is desirable.

The composite aggregate also offers the advantage of being less expensive than traditional aggregates because it does not have to be mined. And because it is made from waste materials, it affords environmental advantages via its disposition as a commercial product.

Yet another embodiment of the present invention relates to the utilization of waste lime ($CaCO_3$) precipitated by industrial processes such as sugar refining, in conjunction with fly ash and various bottom ashes from coal combusted in industrial boilers and furnaces. More specifically, the invention relates to a mixture of these materials and to a quick setting cementitious mass suitable for use as self-supporting film material in the case of certain construction needs.

The mixture of class C fly ash and PCC that is preferred for mass fill on a landslide intervention project ranges, by volume, from about 50 to 66% of class C fly ash with the corresponding balance, by volume, being substantially PCC. The addition of bottom ash is optional, in which case the proportions by volume preferably would be about 4 parts class C fly ash, 3 parts bottom ash and 3 parts PCC.

For anti-landslide projects, precast blocks made of class C fly ash and bottom ash may be used to form the mass fill if project engineering specifications do not require concrete block forms. The ash-based blocks, while lower in strength than concrete, are considerably less expensive. In most cases, the strength of concrete blocks may not be needed because strength is supplied by the mass of the fill.

Figure 2:
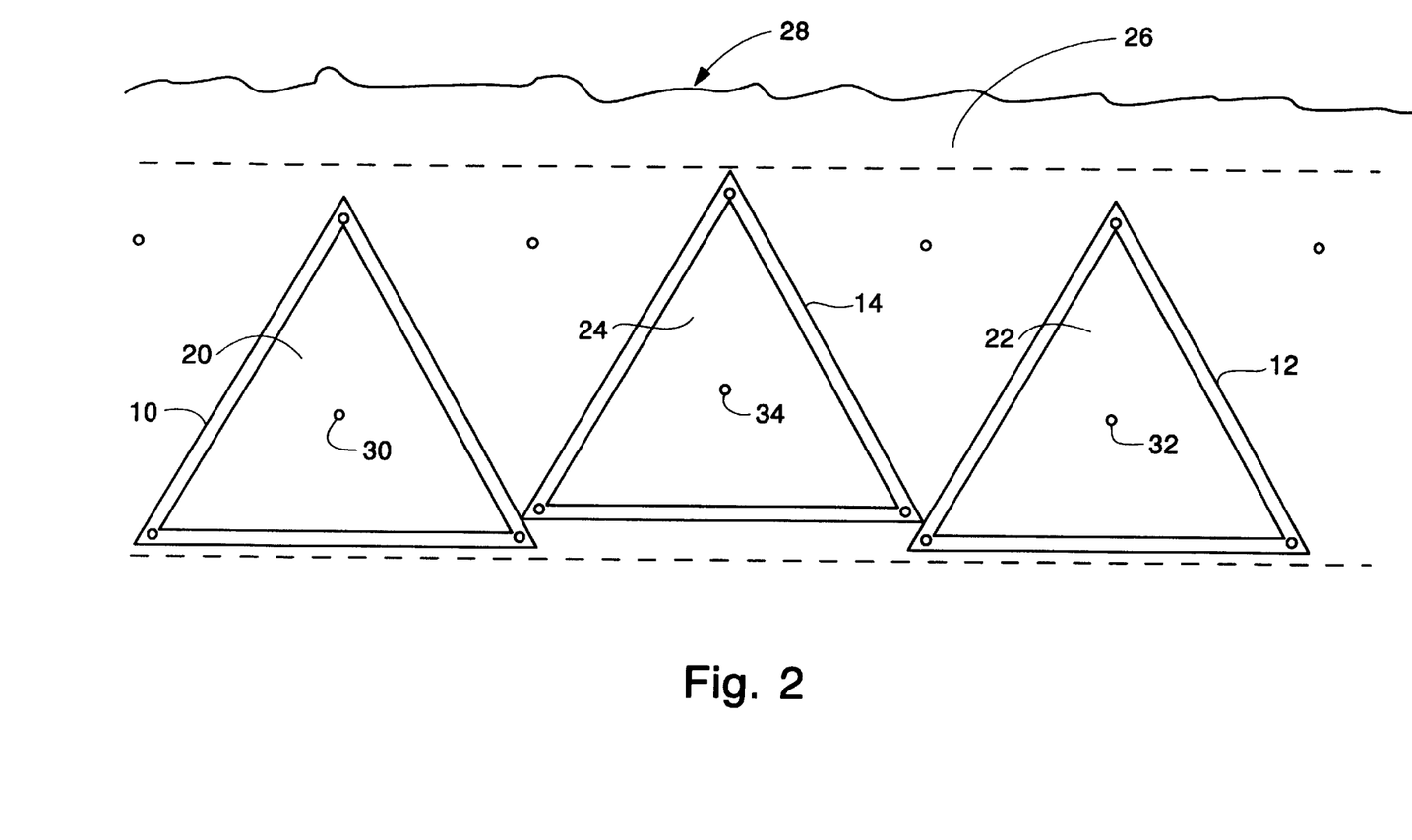
FIG. 2 illustrates a cross-section of a row of precast blocks assembled according to an embodiment of the present invention.
Figure 3:
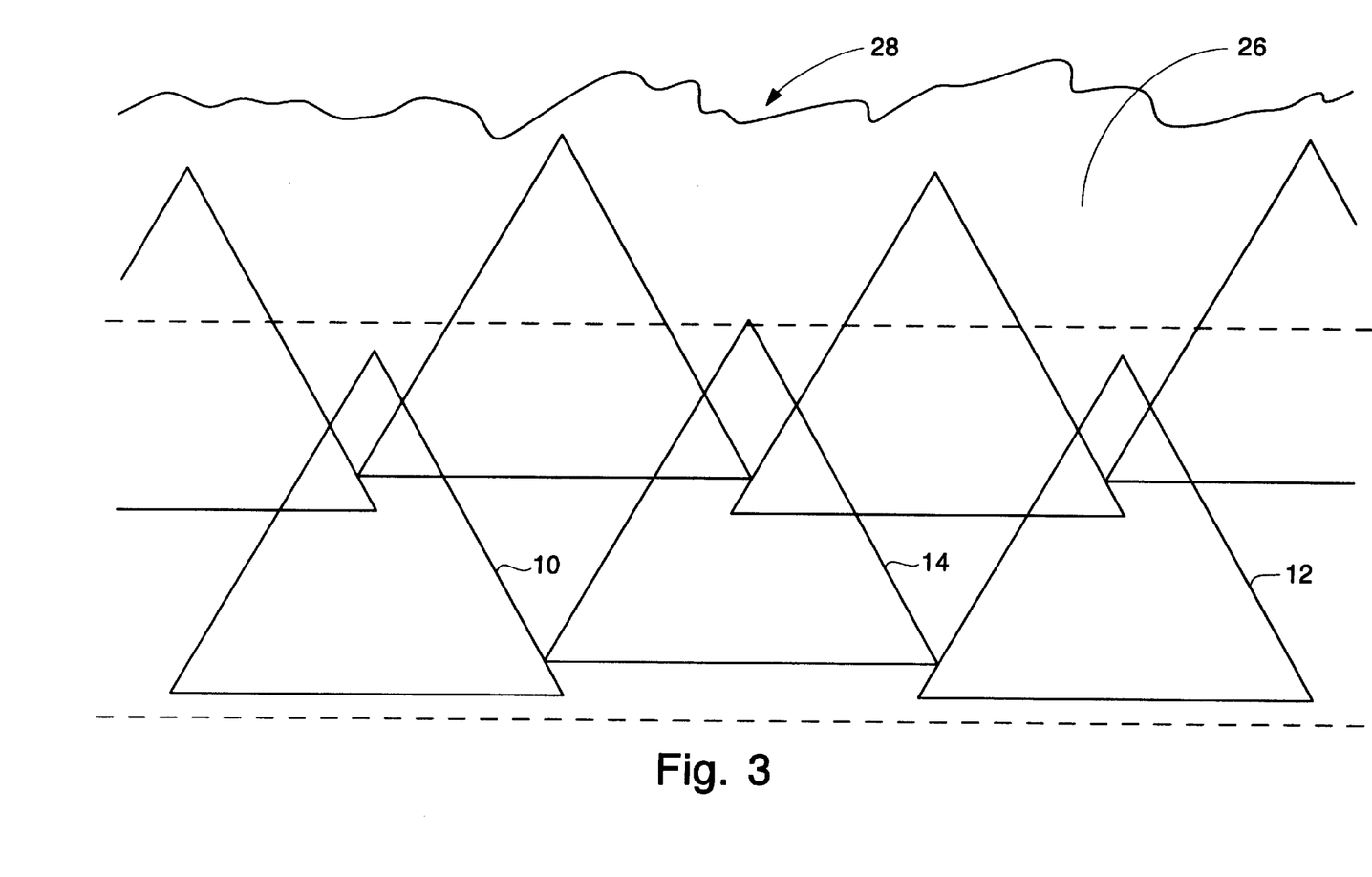
FIG. 3 illustrates adjacent tiers of pre-cast blocks assembled according to an embodiment of the present invention.

According to a preferred embodiment, triangular, remesh-reinforced blocks, prepared with holes for insertion of steel rebar at the corners, are precast from a mixture of class C fly ash, PCC and bottom ash. Preferably the ratio of material used is about 40% class C fly ash, 10% PCC and 50% bottom ash. For example, these blocks can measure about 2 feet high and about 2 inches thick with equal sides of about 3 feet. These blocks are preferably trucked to the project site. Referring to FIG. 2, the first row or tier of these blocks 10, 12, and 14 are placed on rebar 30, 32 and 34 sticking up from concrete footings. Any one of the block's sides forms the wall face. The first blocks 10, 12 in the base tier are placed about 2'9" apart. The gap is filled with the same kind of 3-foot long block 14 placed inside the gap, so that the corners are locked against the inside faces of the outermost set of blocks. This forms a wedged interlock which will resist pressure exerted outward by material from the unstable hillside by diverting some of the force sideways. Once in place, the inside portions 20, 22 and 24 of the triangular blocks are filled with the quick setting mass fill and the void 26 between the row of blocks and the hillside 28 is also filled. Additional tiers of blocks are added, stacked in stairlike setbacks as is illustrated in FIG. 3 and filled in a similar manner. Connections between the tiers is accomplished with steel rebar. Although illustrated as equilateral triangles, it will be appreciated that the triangular blocks can take other forms such as isosceles triangles and/or triangles having concave or convex sides.

The object of a mass-fill for stabilizing landslide-prone slopes is to interpose as much resistant mass as possible at the base and side of the slide points, often in the least amount of time and with the least expenditure. While poured concrete is suitable for this purpose, poured concrete demands massive forms that require extensive and expensive construction time. Because of the mass required, huge amounts of concrete inflate the expense. The ash-PCC product of the present invention, being low-cost waste, creates no such difficulties, allowing for the quick construction of wide-base, thick cantilevered walls designed to drain moisture from the hillside.

When the quick mass-fill invention is used, the precast blocks become, in effect, the forms. Once the mass fill sets behind the blocks, preferably within about 15 minutes, the blocks become the skin of the entire massive wall. The inward-pointing sides of the triangular blocks become the deadmen for the wall, counteracting the outward force of the hillside with the weight of the material above the block. In addition, the wall itself and its mass is built and poured in cantilevered steps to exert the gravitational pressure of its mass against the hillside.

Procedurally, once the site has been prepared with concrete footings, the first row of precast blocks is set in place and the mass-fill material of class C fly ash and PCC is poured behind them. The blending, mixing and pouring of the materials takes place on site using truck-trailer mounted equipment. Other trucks supply a continuing stream of water and raw materials.

In preparing the raw materials for mass fill use, the class C fly ash must be kept dry and the PCC must be dry enough to avoid agglomeration from moisture or premature hydration of the class C fly ash when blended in a dry state. Water is added to the dry material once it is pre-blended in the preferred proportions. Immediately after enough water has been added to make a fluid mixture, the resulting slurry is poured behind the first row of precast block forms. The mixing-pouring truck proceeds down the length of the bottom row of precast block forms, filling to the top of the blocks the void between the blocks and the side of the hill being stabilized.

As the mixer truck proceeds, a second row or tier of block forms is being set in place behind it. Depending upon the slope of the hill and the engineering requirements of the site, these successive tiers are set back, like risers in a stairwell. The void behind each tier is successively filled with the mass-fill until a designated height is reached. Thus, because of the quick hardening time of the mass fill material, it may be possible to build several tiers in the same day. Additionally, as each tier rises in set-back fashion, the mass of the upper portions of the wall are gravitationally placed, like a cantilever, against the hillside, as noted above. This counteracts gravitational forces that tend to push the slope's soil downward. Other engineering features, such as use of steel rebar within the poured wall depend upon specifications for each such project. The precast blocks are designed to accommodate union with such steel rebars.

Another preferred feature of the design of the entire wall is the placement of non-corroding spacers between each tier of precast blocks, providing ¼ to ½ inch "weep" slots to drain water. Behind each of these slots, preferably in the lowest three or four tiers, a 4 to 6 inch layer of gravel or stone is placed before pouring the next mass-fill. The slots and the gravel behind them provide for constant seepage of water from the hillside and prevent the accumulation of water during wet seasons. It is the buildup of such water in the soils that leads to instability of the hillside in the first place. In other words, the wall drains while it holds the soil in place, relieving hydrostatic pressures that could induce collapse of the wall.

According to another embodiment of the invention, a quick, solid fill for pipeline trenches is provided. Where secure support of a pipeline to avoid rupture caused by settling of soils is needed, a mixture of class C fly ash and PCC is ideal. Because of the mixture's application as a fluid, trenches can be filled without voids or danger of soil settlement as fast as they are put in place. Top soil can be put in place within an hour after filling. No time-consuming, error-prone soil compaction is required. The mixture, though hard, is soft enough to allow removal by digging if reentry to the pipe is required.

The mixture preferred for such use includes from about 25% to 33% class C fly ash, with the balance composed primarily of PCC.

The present invention synergistically creates, from the raw materials, essential characteristics for specific uses which are not offered by existing materials such as concrete. The material is more porous, allowing water to travel through it without deteriorating. It allows for less expensive, simpler and faster construction. It is less energyconsumptive and conserves environmental resources and it can be made less hard and more manageable for removal, as necessary.

A further aspect of the present invention relates to the production of interlocking panels, preferably fabricated entirely from recycled waste materials, to be used when assembled as the inner and outer forms for concrete walls. The wall forms remain in place as the liner and outer surfaces of the concrete wall, with the particular advantage of providing a surface with insulation and fire resistance qualities as well as a surface into which ordinary nails or screws can be driven for the convenience of attaching stucco or other surface materials.

The present invention relates to a panel material and how the material complements the form fastening process. According to the present invention, the wall form panels are made from a mixture predominately comprising fly ash, a waste material from the combustion of coal, and waste cellulose fiber, such as sawdust or shredded municipal waste paper. Such compositions are disclosed in more detail in U.S. patent application Ser. No. 08/379,949 by Strabala, the disclosure of which is incorporated herein by reference in its entirety. Preferred compositions according to the foregoing application can include 70–85 weight percent fly ash and 15–30 weight percent cellulosic material. An adhesive binder can also be included. Such materials provide good insulation and fire resistance while permitting ordinary nails, screws or the like to be inserted into the surface without significant cracking.

These materials are formed into a hydraulic paste and pressed by machine into rectangular panels with interlocking tongue-and-groove edges. According to an embodiment of the present invention, the panels can be formed into the shapes described with reference FIGS. 1 and 3, and the panels are preferably used in conjunction with the fastening systems depicted in FIGS. 2, 4A, 4B and 5. In one embodiment, the made-from-waste panels measure about 12 inches high, 40 inches long and two inches thick. However, other dimensions are feasible and can be equally useful.

Figure 4:
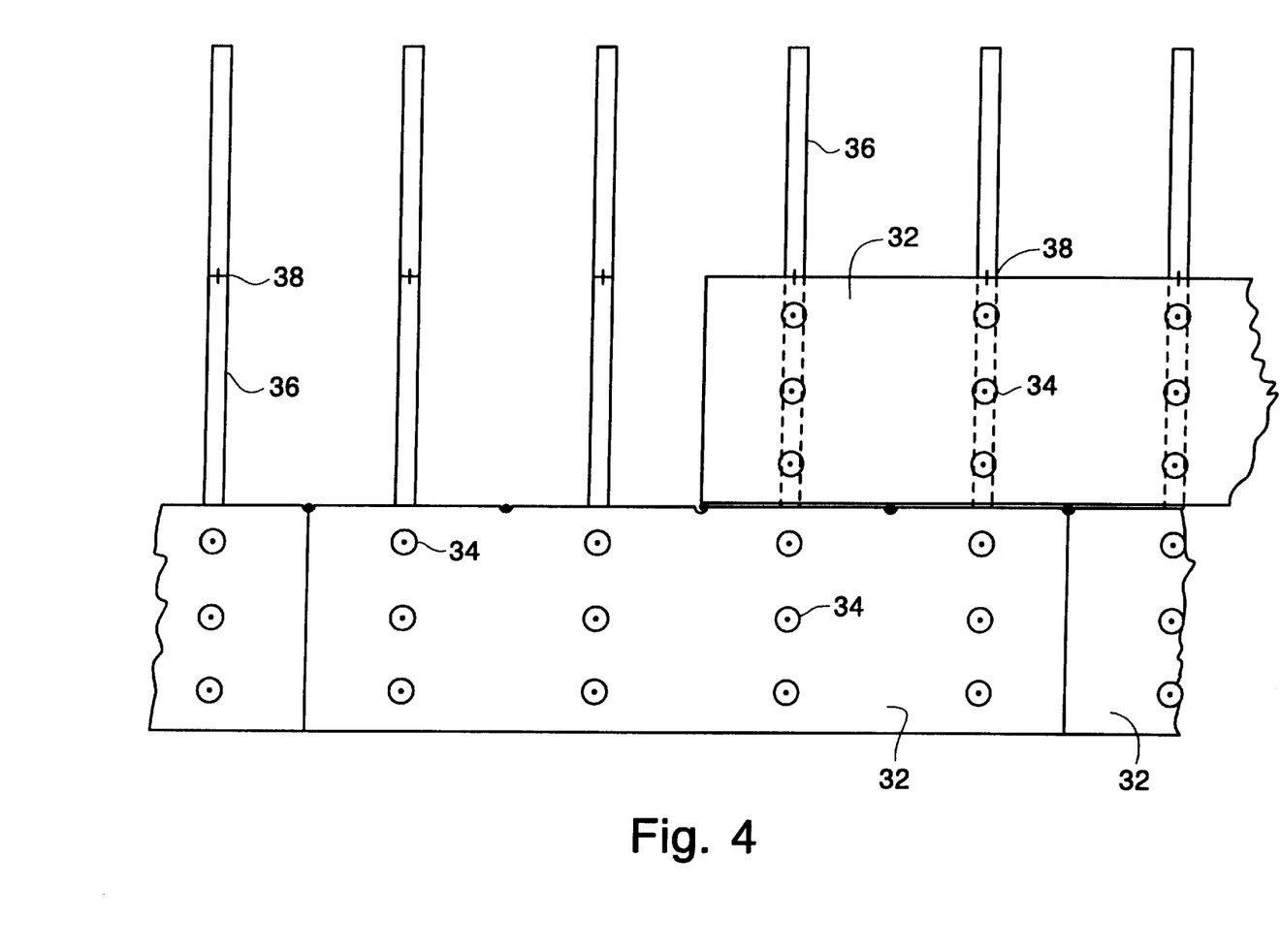
FIG. 4 illustrates a wall forming system according to an embodiment of the present invention.

Referring to FIG. 4, flat panels 32 which are preferably cast from the foregoing compositions of recycled materials are interlocked to make a form ready for the pouring of a concrete or similar type wall. The panels include recessions 34, such as circular recessions, that are adapted to receive screws 70, 72 (FIG. 8) for assembly of the wall form. Retainers 36 are provided and are preferably made from plastic, and more preferably from recycled plastic. The retainers can be formed by methods such as injection molding or extrusion. The width of the retainers 36 is preferably substantially equal to the desired width of the concrete wall. The retainers 36 are preferably set into pre-molded grooves 50 (FIG. 5) in the back of the panels 32 and secured in the grooves with the screws 70, 72. The retainers 36 are preferably provided with snap-together joints 38 such that numerous retainers can be assembled to extend the height of the wall form.

Figure 5:
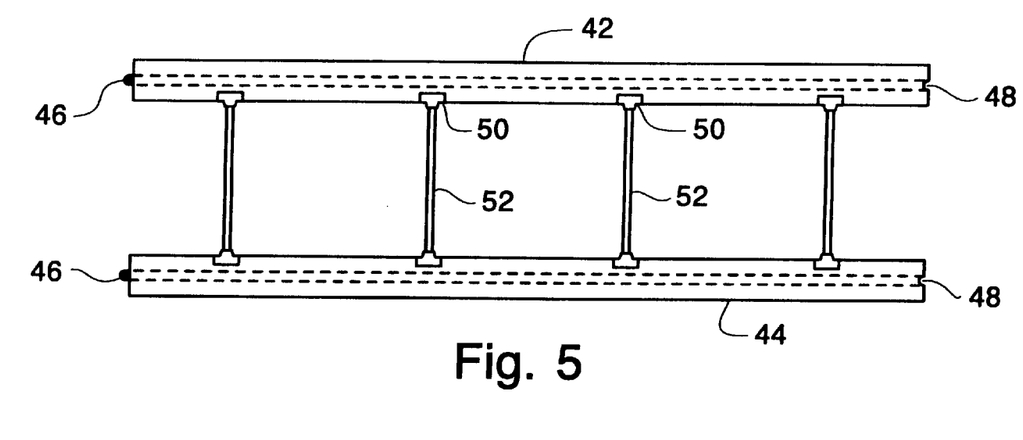
FIG. 5 illustrates the cross-section of a wall forming system according to an embodiment of the present invention.
Figure 6:
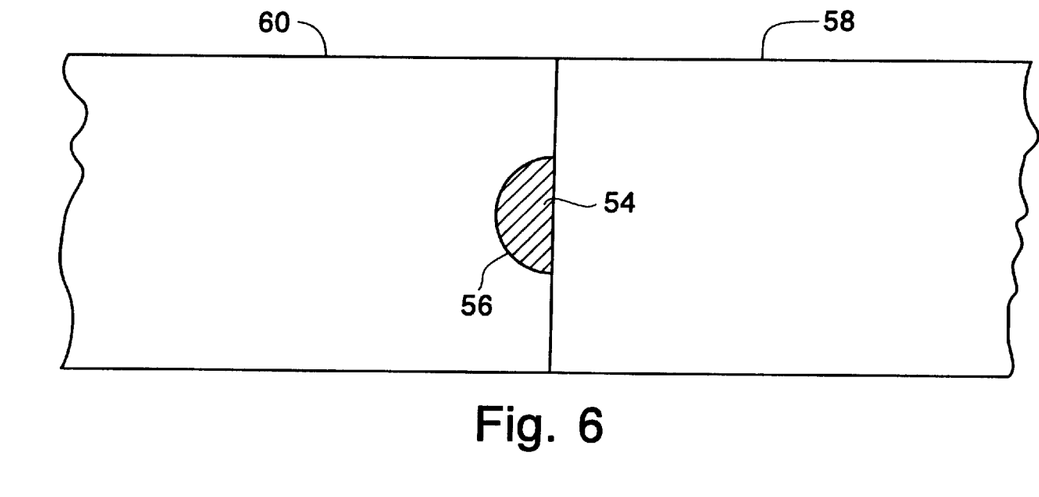
FIG. 6 illustrates the detail of a tongue-in-groove interlock of a wall according to an embodiment of the present invention.

Referring to FIG. 5, as each pair of opposing panels 42 and 44 is positioned where the inner and outer sides of the wall are to be formed and a retainer 52 capable of accepting and anchoring a screw 70 (FIG. 8), is aligned between them. Screws are then powered through the panels 42 and 44 with the screw tips anchoring the plastic retainers 52 into the recesses 50 of the panels 42, 44. This process is repeated for each pair of successive panels in the same lateral rank. The ends of the panels are provided with tongue 46 and groove 48 cooperating structures for interlocking. For example, FIG. 6 illustrates a tongue 54 of a first panel 58 interlocked with the groove 56 of a second panel 60.

The retainers, which are about the same height as the panel, and in the most common size, would typically result in a wall of about eight inches thick. Referring to FIGS. 4A and 4B, each retainer 61, 63 has interlocking tips 62 which enable the successive rows of plastic retainers to be clipped and fastened to those below. In this way, the plastic retainers are connected to form a vertical lattice for the interior spacing and support of the additional wall form panels.

Figures 7A, 7B:
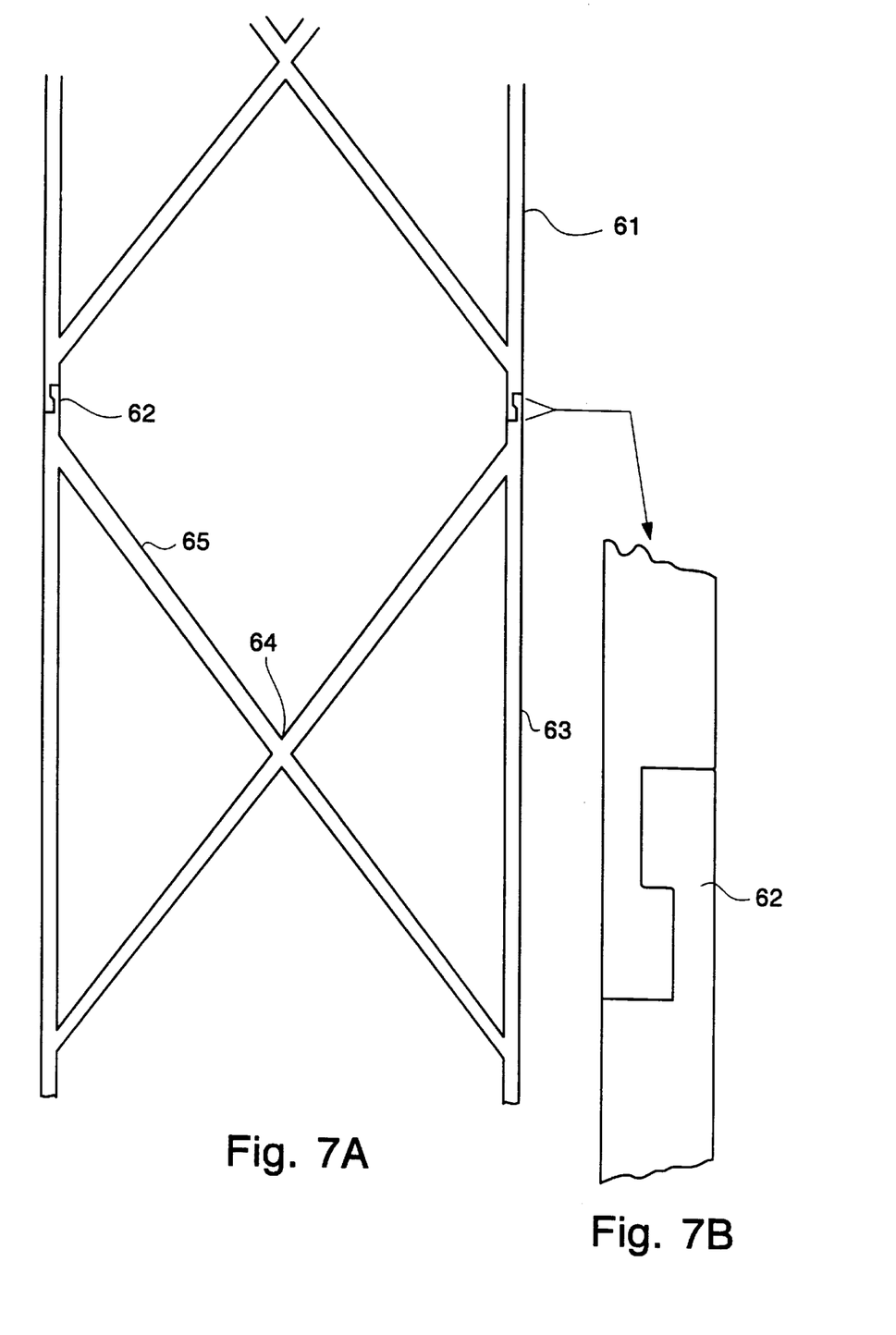
FIGS. 7A and 7B illustrate a plastic retainer for a wall forming system according to an embodiment of the present invention.

As is discussed above, the connection between the wall panel and the retainer is accomplished by means of the screw, rather than by a pre-formed slot in the panel mated to grooved hooks in the retainer, as is the case with the polystyrene panel method. This makes the configuration of both the made-from-waste retainer and its wall panel simpler than the polystyrene configuration. The lattice, though simpler in design, can also used to support steel reinforcing bars for the concrete. Referring to FIG. 7A, the retainer 63 includes an interior lattice 65 that forms a joint 64 that can support steel reinforcing bar that is inserted into the concrete wall.

Figure 8:
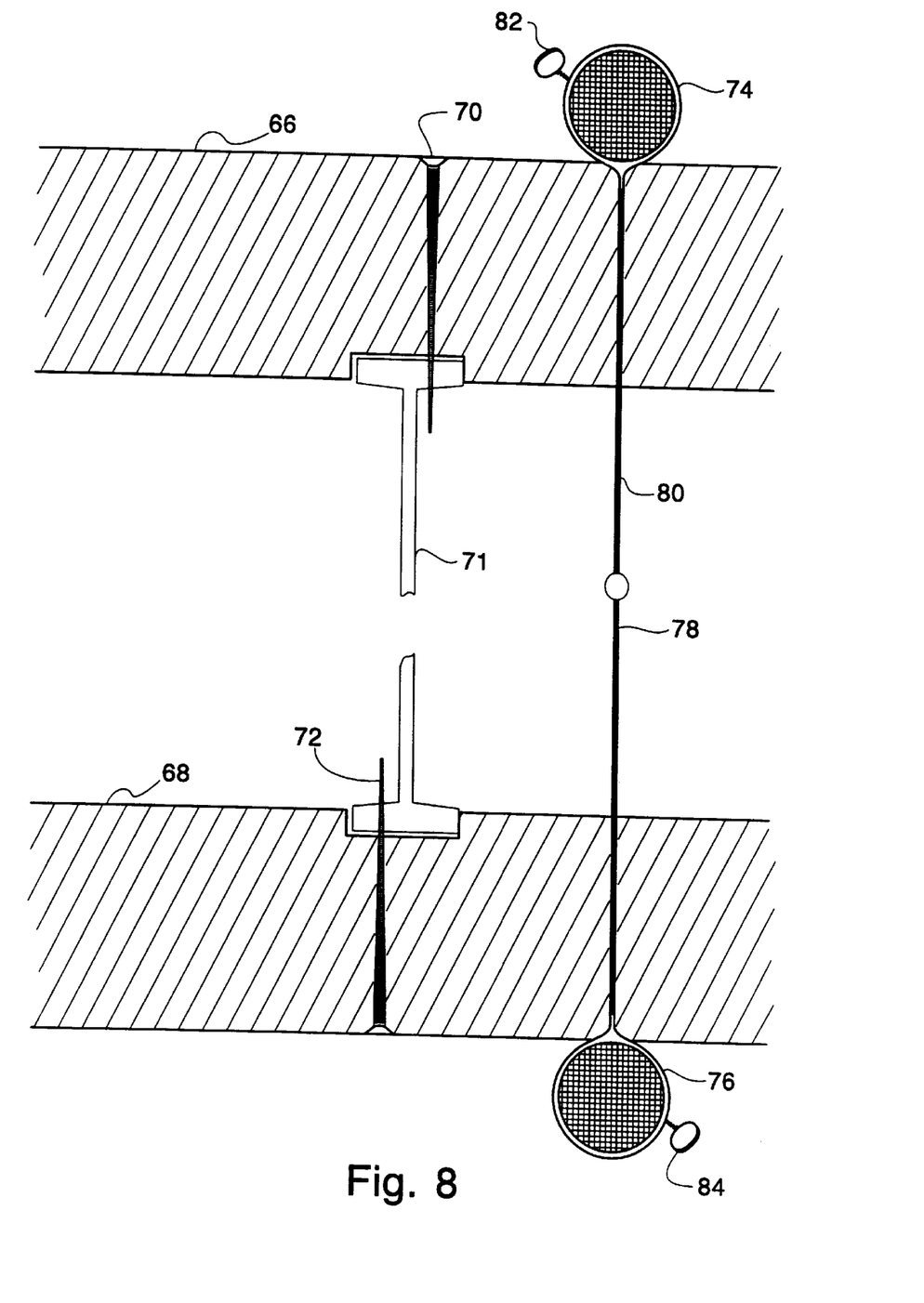
FIG. 8 illustrates a fastening system for a wall forming system according to an embodiment of the present invention.

Referring to FIG. 8., the final preferred step in using the made-from-waste wall forming panels 66 and 68 involves looping tie wires 78 and 80 around thick steel bars 74 and 76 placed vertically outside both sides of the wall panels and opposite each vertical plastic lattice 71. More specifically, after being loosely looped around one steel bar 74, the tie wire loop 80 is inserted through the seams of the wall panels and out the other side where it is secured to the other steel bar 76. In this way, the wire courses through the interior of the wall space being formed where it will remain after the concrete wall is poured. Inward pressure of the wall panels is exerted by twisting the tie wires 78, 80 at loops 82, 84, thereby tightening them against the retainer 71. The steel bars; 74, 76 thereby firmly resist the outward pressure of the liquid concrete when it is poured. After the concrete dries, the wire on the external portion of the walls is cut and the steel bars are removed. The wall form panels 66, 68 remain in place, secured by the screws 70, 72 to the retainer 71 embedded in the concrete. The exterior sides of the wall-forming panels can be directly stuccoed for finished appearance.

The advantages of the current invention over the polystyrene system include, but are not limited to: simpler design and construction use; significantly lower cost; significantly higher strength; more secure mode of assembly; a straighter, more accurate wall; fire resistance; an interior surface ready for attachment of other material; quicker and less expensive assembly; and environmentally-friendlier impact on resources.

An additional aspect of the present invention relates to the shape and design features of a one-piece form, with quick release, which enables the casting in one step of cementitious blocks or bricks which are stackable and interlocking by virtue of contours impressed by the form, so that the blocks may contain at the same time through-and-through holes for multiple useful functions of the finished block. This is accomplished in single-piece fashion by proper gatefolding of the forms' sides.

The one-piece gatefold form according to the present invention is particularly advantageous for casting the semi-cementitious building material that is the subject of U.S. patent application Ser. No. 08/379,949 by Strabala, the disclosure of which is incorporated herein by reference in its entirety. However, it may be equally useful for casting ordinary concrete blocks or bricks in cases where other more complex means are now being used.

Figure 9:
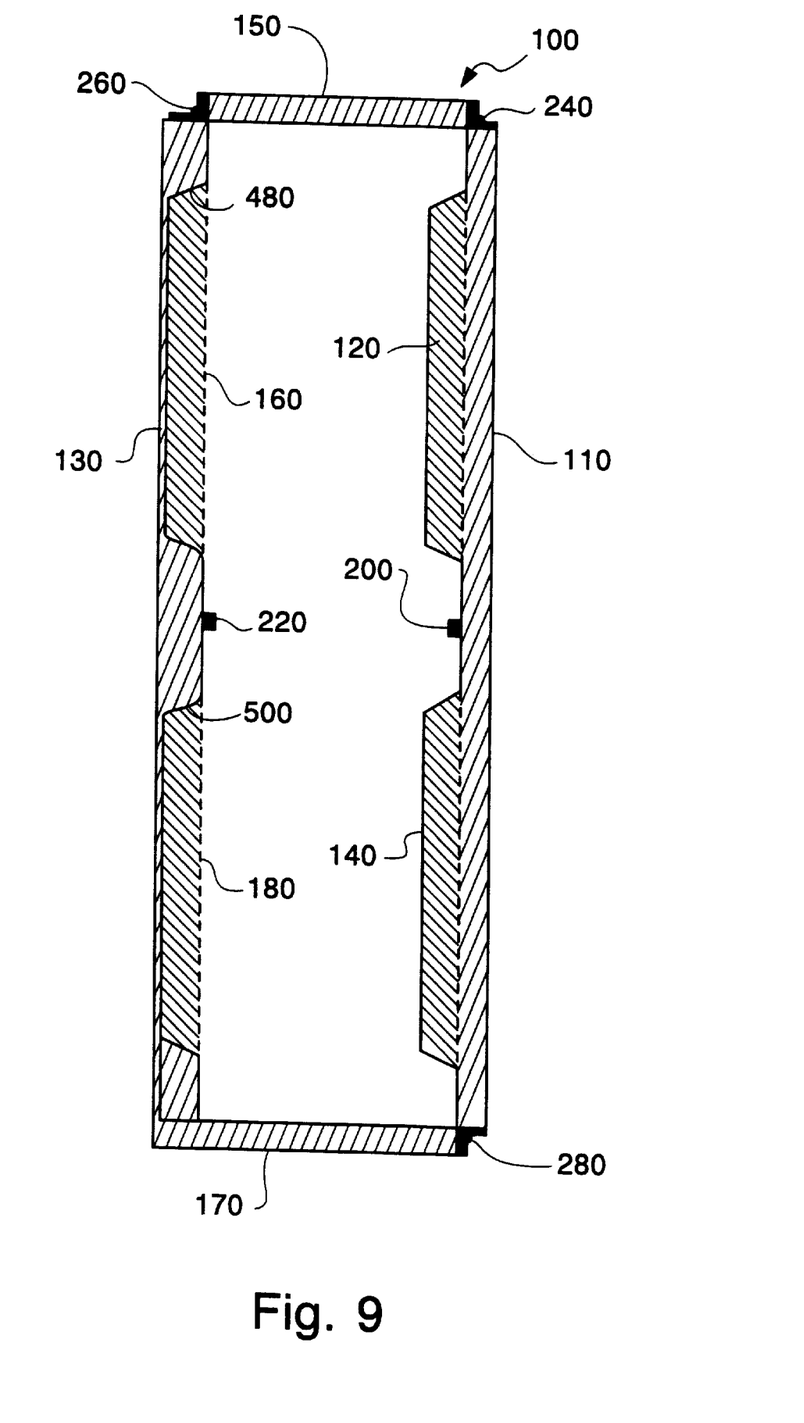
FIG. 9 illustrates a cross-sectional view of the top of a gatefold form according to an embodiment of the present invention.

FIG. 9 illustrates a single-piece gatefold 100 according to the present invention. Circular protrusions 120 and 140 are provided on the inside surface of a first side piece 110. On the inside surface of the opposed second side piece 130, circular recesses 160 and 180 are also provided which correlate to the protrusions 120 and 140. The side pieces 110 and 130 are connected to two end pieces 150 and 170. Together, these features form an interlock mechanism for cast blocks formed with the gatefold 100. Raised buttons 200 and 220 are provided and are adapted to assist with the formation of holes in the cast block, as is discussed in more detail hereinbelow. The gatefold 100 is also provided with hinges 240, 260 and 280 to permit the gatefold 100 to be easily removed from the cast block.

Figure 10:
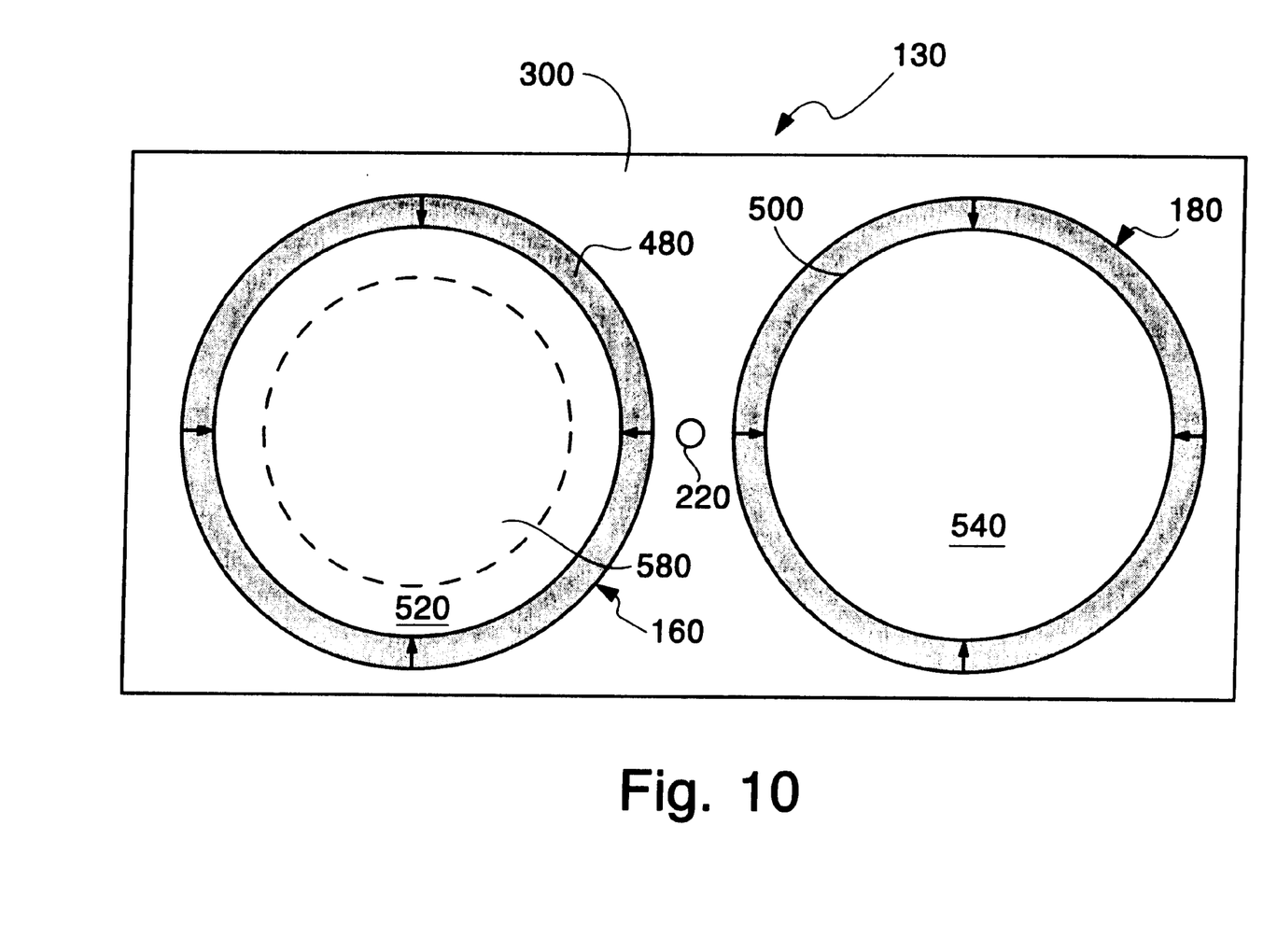
FIG. 10 illustrates a view of a gatefold side piece according to an embodiment of the present invention.

FIG. 10 illustrates a gatefold side piece according to the present invention. The side piece 130 includes a substantially flat inside surface 300 of rectangular shape. The surface 300 includes two circular recesses 160 and 180 which are adapted to form protrusions in the cast block. Thus, the surfaces 480 and 500 slope inwardly in a concave fashion at an angle, preferably about 60°. This creates lower surfaces 520 and 540 below the surface 300 of the side piece.

A button 220 is raised above the surface 300 of the side piece. The purpose of the button 220 is to provide support for a hollow tube which will extend at right angles to the surface 300 wherein the other end of the tube is supported by a corresponding button 200 (FIG. 9) on the surface of the opposing side of the form. The purpose is to provide electrical chases or passage of rebar for a completed wall. Larger buttons 580 can optionally be provided, for example, substantially concentric with the recess 160 to support a tube for creating hollow cores in the block suitable for filling with concrete. The gatefold feature of the form enables the placement and then securing of these tubes in place before the forms are filled.

Figure 11:
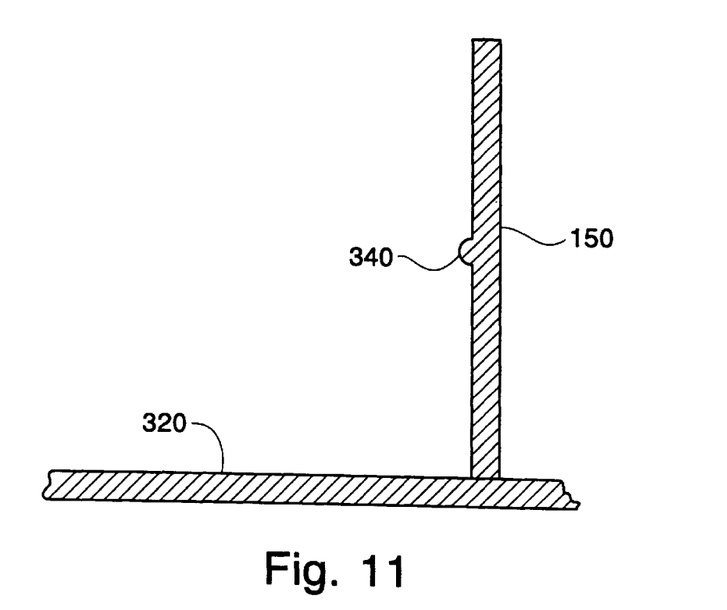
FIG. 11 illustrates a cross-section of a corner of a gatefold according to an embodiment of the present invention.

FIG. 11 illustrates a cross-section of an end piece 150 and base plate 320 of a gatefold according to an embodiment of the present invention. The end piece 150 includes an elongated semi-circular end protrusion 340 on the inside of the form to permit formation of a passageway to allow vertical passage of rebar through the block wall, for example from footing to top plate.

Figure 12:
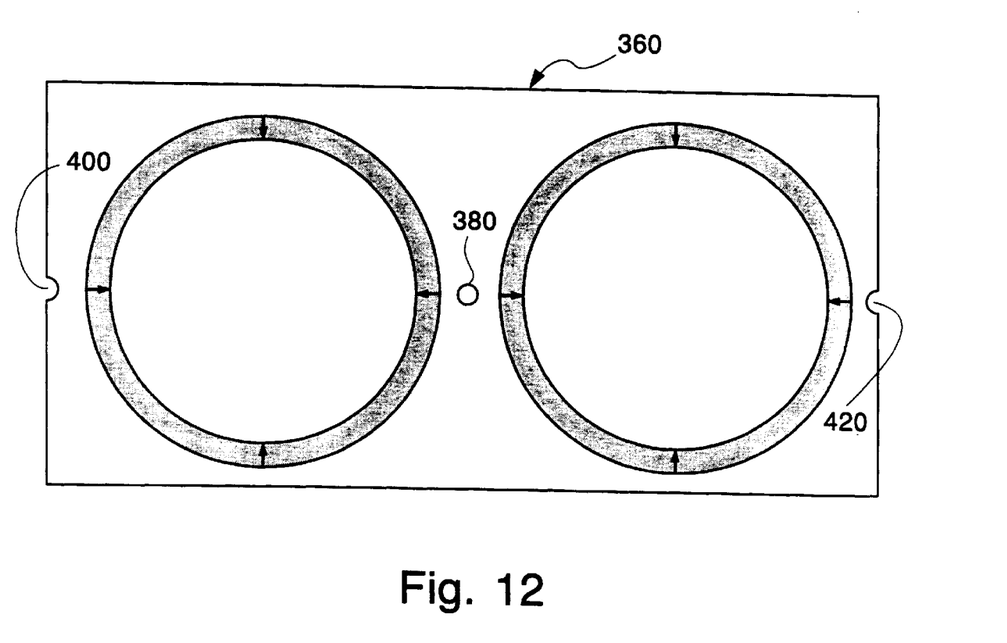
FIG. 12 illustrates a view of a block that has been cast using a gatefold form according to an embodiment of the present invention.

FIG. 12 illustrates a finished block 360 fabricated using a gatefold such as that illustrated in FIG. 11. As indicated by FIG. 12, the block 360 is cast on its side and then placed flat in use. The block includes a hole 380 substantially centered on the block created by the button and tube arrangement described with respect to FIG. 10. As blocks are stacked in stair-step arrangement, this center hole 380 is complementary to half-holes (e.g., 400, 420) on the end of each block when they are abutted.

Figure 13:
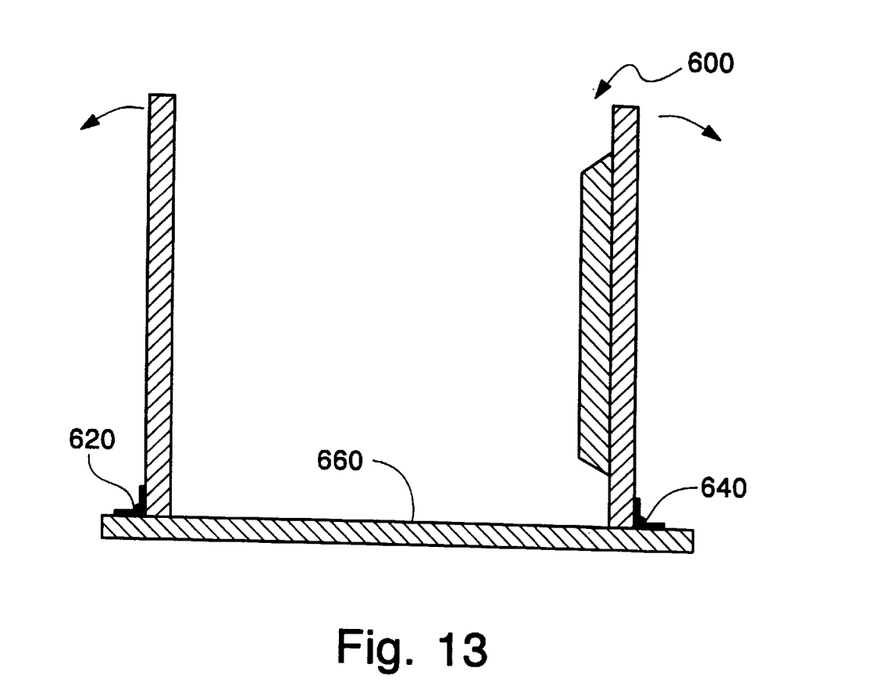
FIG. 13 illustrates a cross-sectional view of the side of a gatefold form according to an embodiment of the present invention.

FIG. 13 illustrates a cross-section of an end of a gatefold 600 with hinges 620 and 640 that attach to the base plate 660. The gatefold function allows for placement of tubes inside the form to create piercing through the molded block and permits ease of removal from the cast material.

Figure 14:
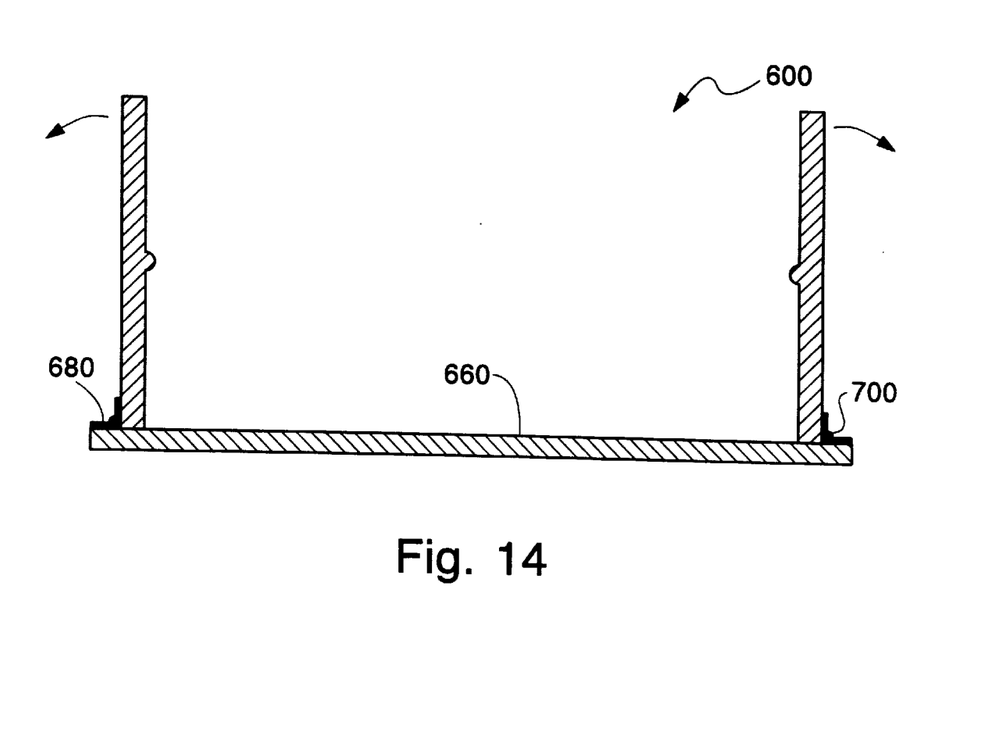
FIG. 14 illustrates a cross-sectional view of a side of a gatefold form according to an embodiment of the present invention.

FIG. 14 illustrates a side cross-section of the gatefold 600, which illustrates the placement of the hinges 680 and 700.

While various embodiments of the present invention have been described in detail, it is apparent that further modifications and adaptations of the invention will occur to those skilled in the art. It is to be expressly understood, however, that such modifications and adaptations are within the spirit and scope of the present invention.

What is claimed is:

1. A composition, comprising:
   a powder comprising F-class fly ash and lime, said powder calcined at a temperature of between about 800° C. and 900° C. for a time period of at least about 10 minutes, said powder, when mixed with between 90 weight percent and 130 weight percent of water, producing a material, that when dried, can withstand at least about 200 psi compression load.

2. The composition of claim 1, wherein said material has a specific gravity of about 2.0.

3. The composition of claim 1, wherein said F-class fly ash is non-pozzolanic and is substantially sulfur-free.

4. The composition of claim 1, wherein said lime comprises between about 33 weight percent to about 60 weight percent of said powder prior to calcining.

5. The composition of claim 1, wherein said material is more fire resistant than gypsum.

6. A composition, comprising:
   a powder comprising non-pozzolanic F-class fly ash and lime, said powder calcined at a temperature of at least about 1,000° C., to form a clinker first product, said first product, after being powderized, mixed with between about 90 weight percent and 130 weight percent water and allowed to dry, producing a second product having a specific gravity of 2.0 and capable of withstanding a compression load of about 1000 psi.

7. A composition, comprising between about 33 weight percent and 60 weight percent of lime prior to calcining, the remainder of said composition comprising bottom ash and non-pozzolanic F-class fly ash in approximately equal amounts, the combined mixture of lime, bottom ash and F-class fly ash being heated to a temperature of at least about 1,000° C., said resultant material, after being powderized, mixed with between about 90 weight percent and 130 weight percent of water, and dried, producing a product having a strength of between about 1,000 psi and about 2,000 psi.

8. The composition of claim 7, wherein said composition contains substantially no C-class fly ash.

9. A composition produced by a process comprising:
   providing non-pozzolanic F-class fly ash;
   creating a mixture by mixing said F-class fly ash with between about 33 weight percent and 60 weight percent precipitated lime prior to calcining; and
   calcining said mixture at a temperature of between about 800° C. and 900° C.

10. A product produced by the process as set forth in claim 9, further comprising:
    adding water to said mixture, said water being present in an amount of between about 90 weight percent and 130 weight percent to form a hydrated calcined slurry;
    conveying said slurry into a form;
    curing said slurry for at least about 3 days to produce a product having a specific gravity of about 2.0.

11. A product produced by the process as set forth in claim 9, wherein said precipitated lime comprises substantially pure powdered $CaCO_3$.

12. The composition of claim 7 wherein said composition contains at least a portion of C-class fly ash in combination with kiln dust or other source of lime.

* * * * *